Nov. 12, 1957 D. J. PEEPS 2,812,895
AIR COMPRESSING UNIT
Filed March 2, 1955 2 Sheets-Sheet 1
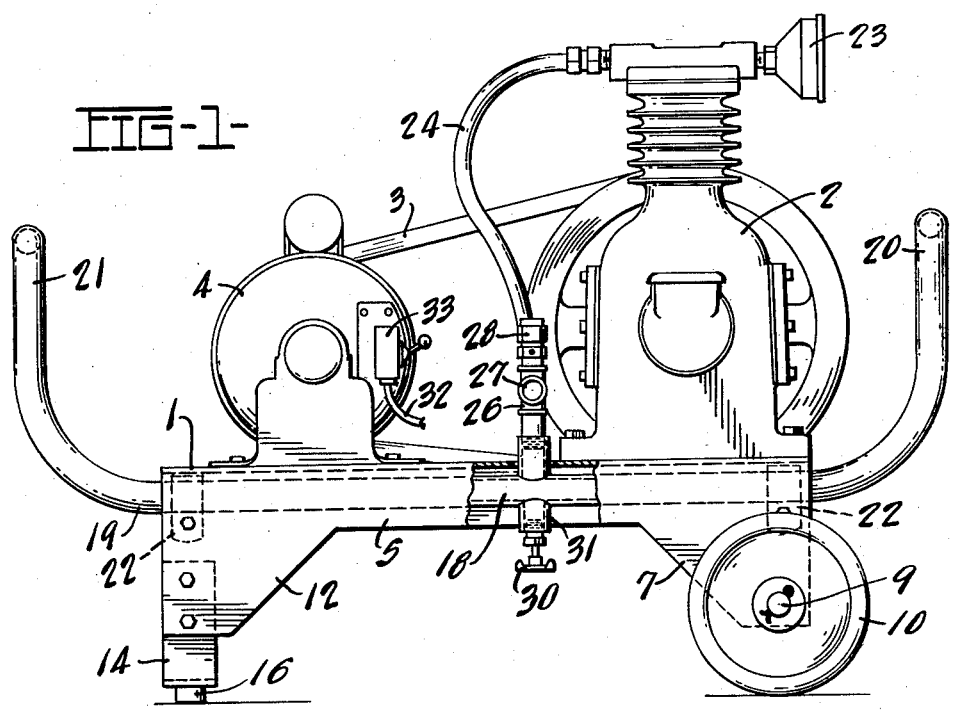
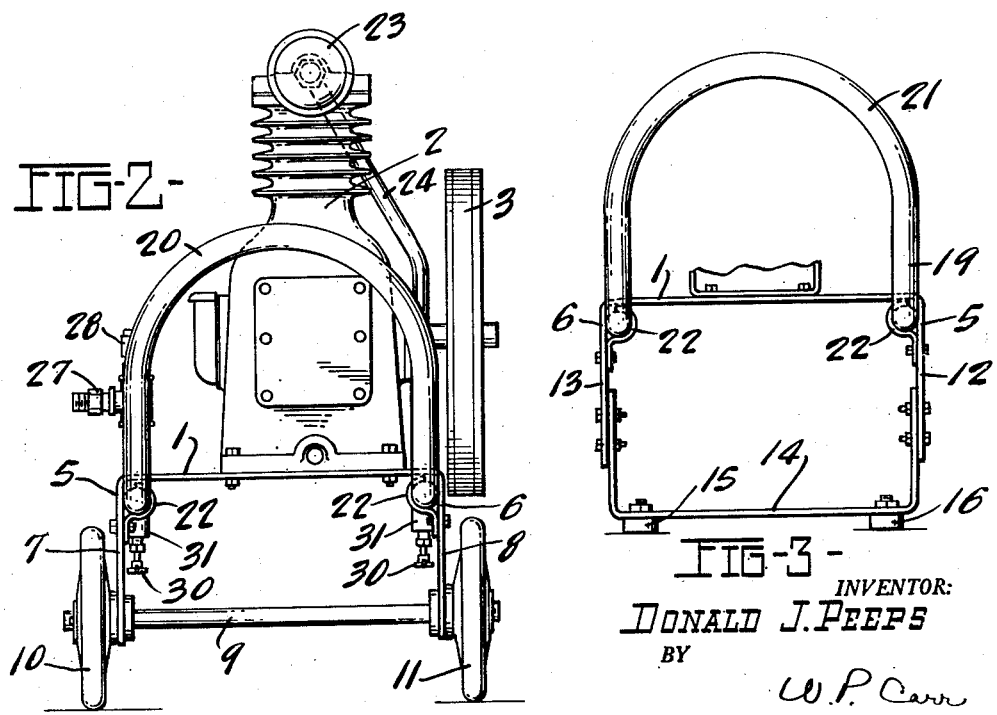
INVENTOR:
DONALD J. PEEPS
BY
W. P. Carr
ATTORNEY.

Nov. 12, 1957  D. J. PEEPS  2,812,895
AIR COMPRESSING UNIT
Filed March 2, 1955  2 Sheets-Sheet 2
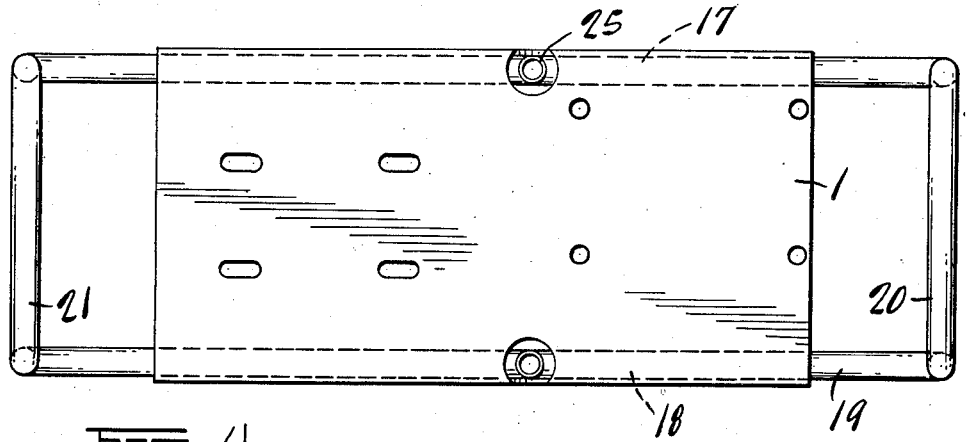
FIG-4-
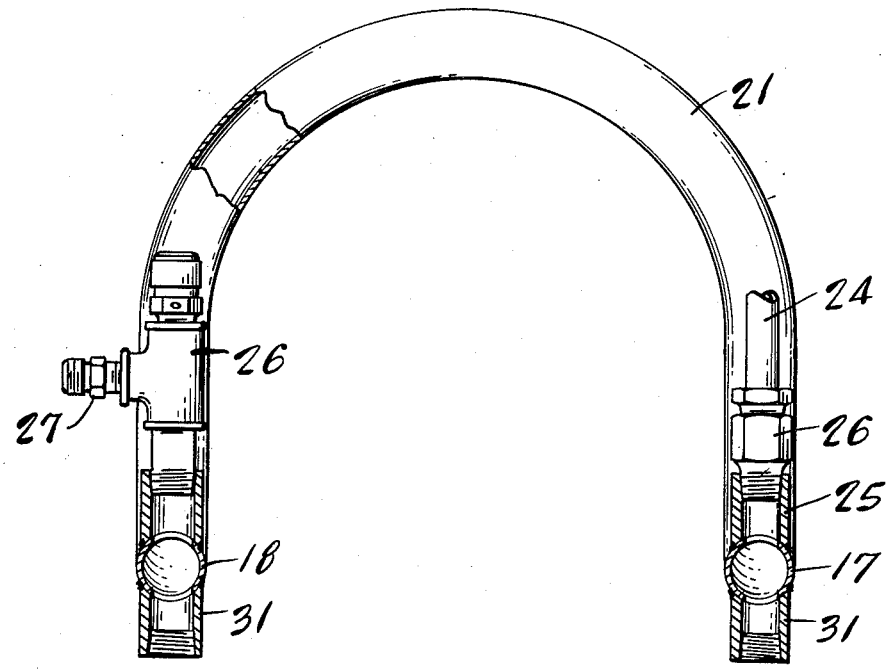
FIG-5-
INVENTOR:
DONALD J. PEEPS.
BY
W. P. Carr
ATTORNEY.

United States Patent Office 2,812,895
Patented Nov. 12, 1957

2,812,895

AIR COMPRESSING UNIT

Donald J. Peeps, Toledo, Ohio, assignor to The De Vilbiss Company, Toledo, Ohio, a corporation of Ohio Application March 2, 1955, Serial No. 491,673

7 Claims. (Cl. 230—58)

This invention relates to an air compressing unit and is particularly adapted to such a unit of a portable type.

A principal object of the invention is to provide an air compressing unit which is compact.

Another object is the provision of an air compressing unit which is low in manufacturing cost and easily assembled. These and other objects and advantages will become apparent upon reading the following description and referring to the drawings in which:

Figure 1 is a side elevation of a compressing unit embodying one form of my invention;

Figure 2 is an end view of the unit of Figure 1 as seen from the right of Figure 1;

Figure 3 is a partial end view from the left of Figure 1;

Figure 4 is a plan view of the platform and frame of the unit of Figure 1; and

Figure 5 is a partial section taken on the line 5—5 of Figure 1.

As shown in the drawings the embodiment of my invention has a platform 1 on which is mounted a compressor 2 driven through a belt 3 by a motor 4. The compressor and motor are both bolted in place upon the platform 1.

The platform has downwardly extending side flanges 5 and 6. These flanges are elongated at their ends providing a pair of legs 7 and 8 supporting an axle 9 for wheels 10 and 11, and a second pair of legs 12 and 13, between which an inverted U-shaped strap 14 is secured. On the lower side of the strap are rubber feet 15 and 16. These feet and wheels 10 and 11 firmly support the air compressing unit in its normal upright operating position.

Running lengthwise beneath the platform 1 adjacent the flanges 5 and 6 are parallel portions 17 and 18 of an endless tube 19, which is held rigidly in place against flanges 5 and 6 by anchoring clips 22. The portions 17 and 18 of the tube are joined beyond the ends of the platform 1 by upwardly extending loops 20 and 21.

The tube 19 is preferably about one inch in diameter and of sufficient wall thickness to permit the end portions 20 and 21 to serve as handles for moving and lifting the compressing unit. The strength of the tube contributes to the rigidity of the platform 1.

Air is drawn into the compressor 2 through the intake 23 and discharged by the compressor into tubing 24. This tubing curves down near the flywheel side of the compressor to an upright nipple 25 to which it is connected by fitting 26. Through the nipple 25 the air is delivered to the interior of the tube 19. This is illustrated in Figure 5.

From its entry point into tube 19 the air moves in both directions along the side portion 17 through the end loops 20 and 21 to the center point of the opposite side portion 18. From there the air travels upwardly into T fitting 26 and to outlet nipple 27. A hose for carrying the air to the point of use is fastened to the nipple 27. On the upper branch of the T 26 is mounted a safety valve 28 of conventional design which is set to permit escape of the air into the atmosphere when the pressure reaches a predetermined point considered a maximum from a safety or utilitarian standpoint.

For the removal of any condensed water and other foreign matter such as oil or rust particles which may accumulate in the tube 19, drain valves 30 are connected to nipples 31 extending downwardly from the side portions 17 and 18. These are designed for manual opening as frequently as conditions require.

A lead wire 32, indicated in Figure 1, is provided for connecting the motor to an electrical source. A hand switch 33 controls the flow of current to the motor. Where electrical power is not available a gas engine may be substituted for the electric motor.

As may be apparent from the foregoing the handle loops 20 and 21 of the tube reach a medium height which make them convenient for vertically lifting the complete compressor assembly for loading in a truck or moving it over obstacles. At the same time loop 21 at the end of the unit having the feet 15 and 16 is not too low for raising that end free of its supporting surface and propelling the compressor assembly upon the wheels at the other end.

It may be noted that the unit is particularly compact due to the absence of the usual large air receiver but still has the tube 19 with a capacity for storing a reserve of air and dampening the pulsations in the air flow from the compressor. The tube has the second function of providing handles as described and further gives extra strength to the assembly.

The light weight of the tube 19 makes it easy to handle in the initial step of assembling the compressing unit when the tube is fastened by the clips 22 to the platform 1. The compressor and the motor may then be bolted in place. The slots receiving the motor bolts permit sliding adjustment of the motor to put the belt 3 under proper tension. The air connections and other fittings are quickly attached, being few in number and located at freely accessible points. Finally the strap holding the feet, and the axle and wheels are fixed to the platform. No large cumbersome air receiver and separate handles are involved. Nor does the assembling require any welding as frequently utilized between an air receiver and platform or to secure handles in place.

It should be understood that this invention is not limited to any specific construction as it is capable of embodiment in various forms within the spirit of the claims.

What I claim is:

1. In an air compressing unit, an air compressor, power means for driving the compressor, a support for the compressor and said means, a horizontally extending tube receiving air from the compressor, said tube being rigidly secured to the underside of and concealed by the support, and an extension of the tube reaching beyond the end of the support and specially shaped to provide a handle for moving the compressing unit.

2. In an air compressing unit, an air compressor, power means for driving the air compressor, a platform supporting the power means and the air compressor, a tubular handle for moving the compressing unit fastened to and extending longitudinally of the platform and extending beyond one end thereof, the portion of the tubular handle extending beyond the end of the platform being turned upwardly, shaped and dimensioned for manual grasping for moving the air compressing unit; means for delivering air from the air compressor to the interior of the tubular handle and an air outlet from the tubular handle for delivering air to an air tool.

3. In an air compressing unit, an air compressor, power means for driving the air compressor, a platform supporting the power means and the air compressor, a tubular air receiver of endless form fastened to the underside of and concealed by the platform, a connection through the platform to the air receiver from the air compressor, an air outlet connection on the air receiver extending up through the platform, and a loop portion of the air receiver extending beyond the end of the platform and specially shaped to provide a handle for moving the air compressing unit.

4. In an air compressing unit, an air compressor, power means for driving the air compressor, a support for the power means and the air compressor, and a tubular air receiver of unchanging diameter and single path, endless form extending longitudinally of and upwardly beyond both ends of the support, the protruding ends of the air receiver being curved and of suitable diameter to provide handles for moving the air compressing unit.

5. In an air compressing unit, an air compressor, power means for driving the air compressor, a platform supporting the air compressor and power means, an endless tubular air receiver connected to the outlet of the air receiver running beneath the platform and having parallel portions fastened rigidly to opposite sides thereof, and extensions of the parallel portions joined together in upturned loops beyond the ends of the platform, such loops being shaped and dimensioned to serve as handles for moving the air compressing unit.

6. In an air compressing unit, an air compressor, power means for driving the air compressor, a platform of inverted U cross section supporting the air compressor and power means, a tubular air receiver of uniform handclaspable diameter, two parallel portions of the air receiver lying oppositely beneath the platform along the depending sides of the inverted U cross section, said portions extending beyond and upwardly from both ends of the platform and joined together to form loop shaped handles.

7. An air compressing unit according to claim 6 in which an air conduit passes through the platform from the air compressor to the air receiver and an air outlet connection extends up through the platform from the air receiver.

References Cited in the file of this patent
UNITED STATES PATENTS

| | | |
|---|---|---|
| 1,716,132 | Hodgkinson | June 4, 1929 |
| 2,685,404 | Wohlmeyer | Aug. 3, 1934 |